United States Patent [19]

Kildea

[11] Patent Number: 5,313,038
[45] Date of Patent: May 17, 1994

[54] EDM DRILLING OF LOW ANGLE HOLES

[75] Inventor: Robert J. Kildea, North Palm Beach, Fla.

[73] Assignee: United Technologies Corporation, Hartford, Conn.

[21] Appl. No.: 994,800

[22] Filed: Dec. 22, 1992

[51] Int. Cl.$^5$ .......................... B23H 9/10; B23H 9/14
[52] U.S. Cl. ...................... 219/69.17; 204/129.7; 219/69.15
[58] Field of Search ............... 219/69.15, 69.17, 69.16, 219/69.2; 204/129.5, 129.55, 129.7, 224 M; 416/97 R

[56] References Cited

U.S. PATENT DOCUMENTS

| | | | |
|---|---|---|---|
| 2,902,584 | 9/1959 | Ullmann | 219/69.15 |
| 4,104,503 | 8/1978 | Di Piazza et al. | 219/69.15 |
| 4,650,949 | 3/1987 | Field | 219/69.15 |
| 4,922,076 | 5/1990 | Cross et al. | 219/69.15 |
| 4,992,025 | 2/1991 | Stroud et al. | 416/97 R |

FOREIGN PATENT DOCUMENTS 57-89529   6/1982   Japan ................ 219/69.15

*Primary Examiner*—Geoffrey S. Evans
*Attorney, Agent, or Firm*—Edward L. Kochey, Jr.

[57] ABSTRACT

Low angle air directing slots in the tip of an airfoil are produced by forming an elongated electrode by forming notches on opposite sides of the electrode and performing electric discharge machine with the electrode. During machining the electrode is oriented and fed at an acute angle with respect to the surface of the airfoil tip to form an opening, and then rotating the electrode to a position increasingly perpendicular to the surface of the airfoil tip.

4 Claims, 3 Drawing Sheets

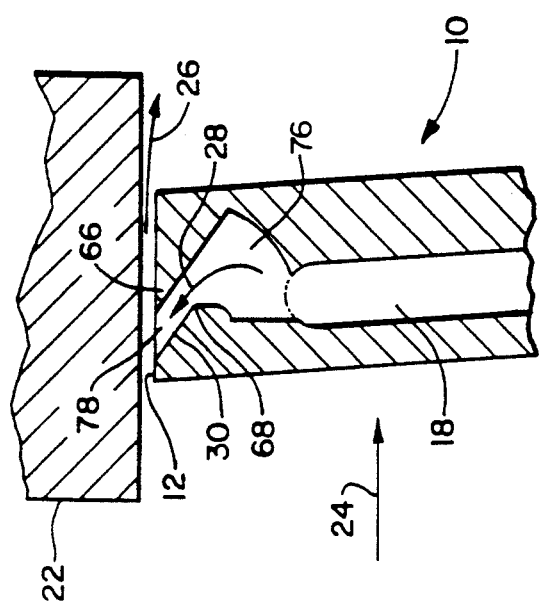
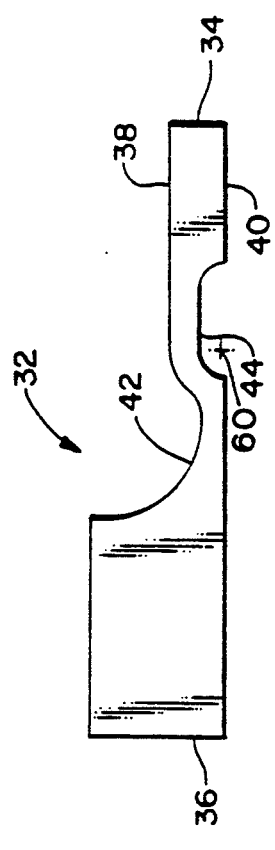
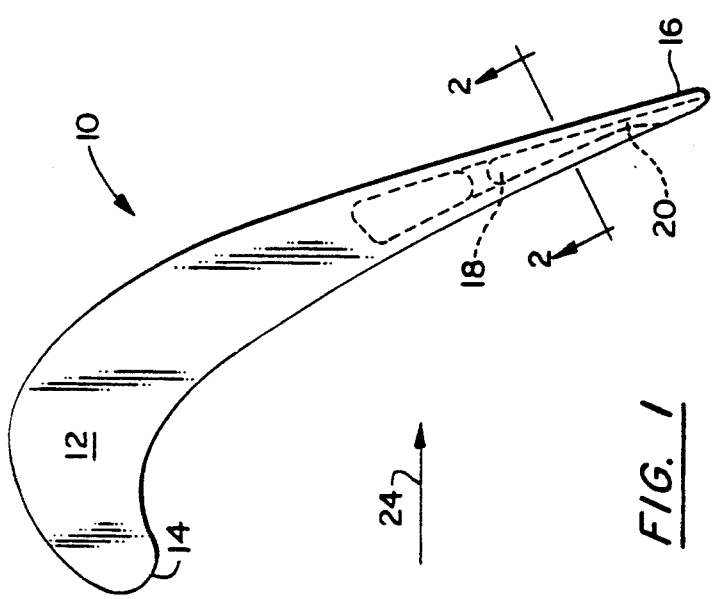

EDM DRILLING OF LOW ANGLE HOLES

The Government has rights in this invention pursuant to a contract awarded by the Department of the Air Force.

TECHNICAL FIELD

The invention relates to forming air discharge holes in the tip of turbine blades, and in particular to EDM drilling of holes to communicate with a pocket which is not axially aligned with the discharge hole.

BACKGROUND OF THE INVENTION

Gas turbines suffer a loss in efficiency because of a portion of the gas passing between the turbine blades and the casing, rather than passing through the blades where the gases do work. Various schemes have been used to decrease this leakage. One such scheme takes advantage of cooling air which is passing though a pocket within the blade by discharging the spent cooling through directed openings in the blade tip. The air is directed at a low angle with respect to the surface of the blade tip in a direction against the flow of gas.

At locations of the turbine blade where the blade is relatively wide, such a low angle hole may be drilled and extend far enough to reach the internal pocket. However, at some locations on the blades, particularly near the trailing edge, the blade is relatively narrow. A straight low angle hole will not contact the air pocket.

The purpose of these openings is not just to discharge gas flow into the linkage space, but to project the air at the low angle countering the leakage flow. Accordingly, the drilled hole should have appropriate peripheral surface to properly direct the flow of air.

Electrode discharge machine drilling has been used for drilling various cooling air holes in turbine blades. It is required that these holes be small and precise in order to properly distribute the airflow through the multiple holes arranged in parallel Such a process of machining is shown in U.S. Pat. No. 4,762,464, issued Aug. 9, 1988 to Vertz et al. Such conventional EDM drilling may be used where the straight line projection of the hole to be drilled intersects the internal pocket. The problem develops, however, where because of the narrowness of the blade the extension of the drill hole does not reach the pocket.

SUMMARY OF THE INVENTION

It is an object of the invention to drill low angle holes in the tip of a turbine blade in a situation where the internal pocket is not aligned with the hole to be drilled, and in a manner to retain wall guiding surface adjacent the air outlet to retain a directed airflow.

An elongated electrode is formed which has a penetrating inboard end and an outboard end. It has two substantially parallel edges defined as an outside edge and an inside edge. A first notch is formed in the outside edge, and a second notch formed on the inside edge. This second notch is at a location on the inboard side of the first notch. The electrode is oriented at the desired low angle to the surface of the blade tip, electrically energized, and axially advanced to form the air directing opening. It is thereafter rotated to a position substantially perpendicular to the surface of the tip. In this position the first notch is located at the tip surface thereby permitting the flow guiding material to remain in place. The second notch is located at the surface of the air directing opening formed by the inside edge of the electrode. This provides clearance whereby the material at the lower edge is not removed for some distance to the inboard side, thereby providing additional flow guiding material at this location. Some variation in the point or axis around which the electrode is rotated is possible, but it generally is around the point at the edge of the opening formed by the inside edge of the electrode and the vertical position of the inside edge of the electrode.

BRIEF DESCRIPTION OF THE DRAWINGS

FIG. 1 is an end view of a turbine blade;

FIG. 2 is a section through a turbine blade near the trailing edge showing the tip;

FIG. 3 is a view of the EDM electrode;

DESCRIPTION OF THE PREFERRED EMBODIMENT

Figure 4:
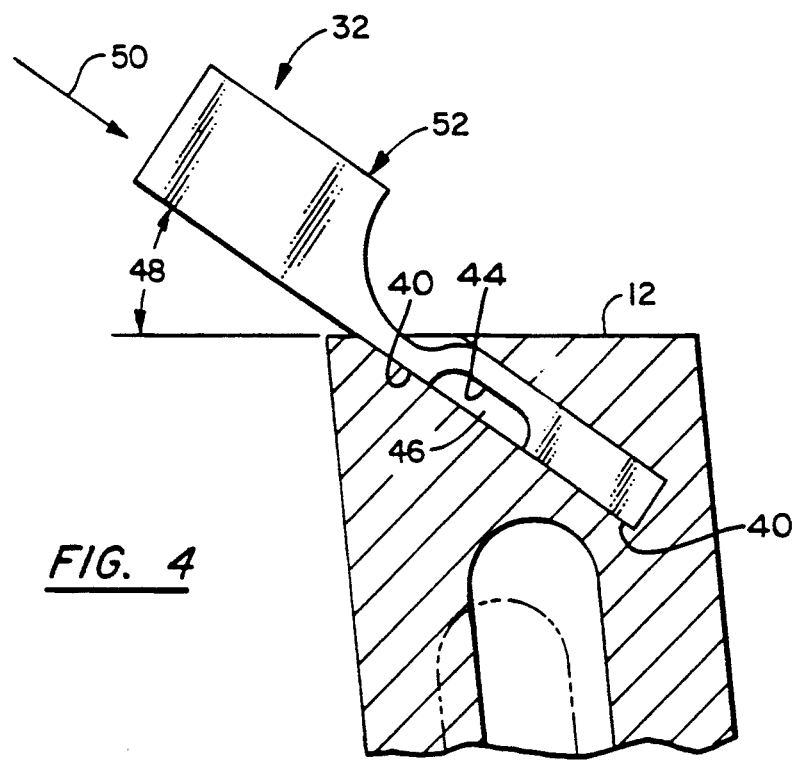
FIG. 4 is a view of the EDM electrode after axial movement before rotation.

FIG. 1 is a top view of an airfoil such as a gas turbine blade 10 with tip surface 12. The leading edge 14 of the blade is relatively wide while the trailing edge 16 is narrow. Internal pockets 18 are located within the blade and contain pressurized cooling air. A portion of this cooling air exits through a cooling passage 20. Section 2—2 through the blade is shown in FIG. 2 in conjunction with turbine containment structure 22. As gas flow 24 moves through the turbine, a portion 26 leaks between the static structure 22 and the tip of the blade 12. Air jet 28 is projected at a low angle with respect to surface 12 in the direction to counter the leakage 26. The air directing opening or slot 30 must be formed to effectively direct this airflow.

This opening must be formed in such a way as to retain its ability to direct the airflow counter to leakage 26 while being in fluid communication with cooling air pocket 18.

To this end, an electrode 32, as shown in FIG. 3, is formed. In speaking of electrode size, it should be recognized that in electrode discharge machining some clearance is formed between the electrode and the opening formed, and that therefore the electrode is slightly smaller than the final hole. The thickness of the electrode is substantially that of the width of the hole to be formed.

The elongated electrode 32 has a penetrating inboard end 34 and an outboard end 36. It has an outside edge 38 and an inside edge 40. A first notch 42 is formed on the outside edge and a second notch 44 is formed on the inside edge. This second notch is located inboard of the first notch and the relative spacing between these two notches is better seen in the review of the operation of the electrode.

Referring to FIG. 4, the slot 46 is to be formed at a low angle 48 (preferably 35 degrees, but less than 60 degrees) with respect to tip surface 12. The energized electrode is moved axially 50 to a first position 52, illustrated in FIG. 4.

Figure 5:
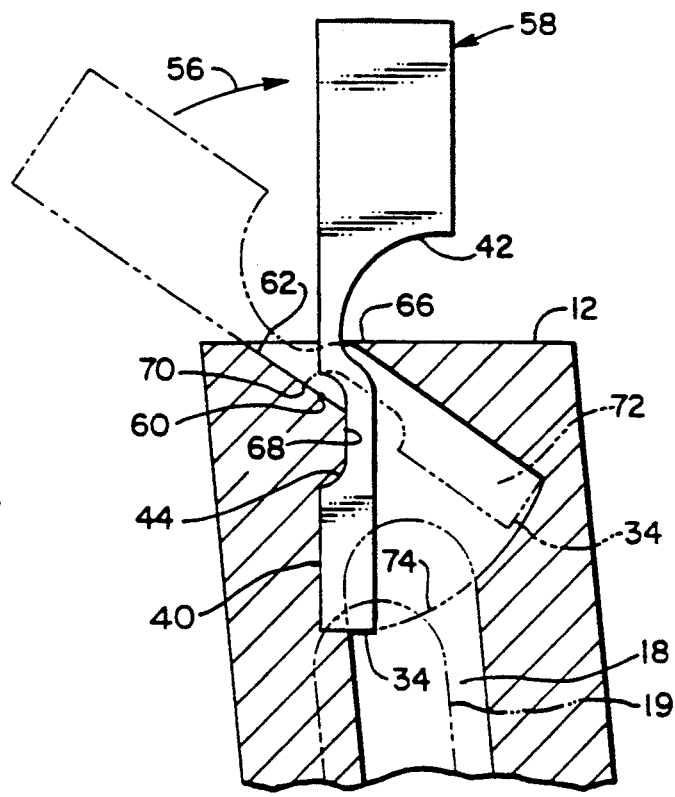
FIG. 5 is a view of the EDM electrode in its final rotated position with the initial position shown in phantom.

Referring to FIG. 5, the electrode while still energized is rotated 56 to position 58 where the electrode is substantially perpendicular to tip surface 12. The electrode is preferably rotated around axis 60 which is located ideally at the mouth of notch 44 (FIG. 3), at a location defined by the inside edge 40 of the electrode.

Notch 42 (FIG. 3) is defined so as to clear the ledge 66 (FIG. 2) cut by the electrode before rotation and notch 44 is defined to clear surface 30 (FIG. 2) for some distance inboard of the pivot point 60. It can be seen that the shape of the notches is dependent on the location chosen for the pivot 60.

The tip 72 adjacent the inboard end 34 of the electrode rotates around the selected axes through arc 74 penetrating pocket 18. A second pocket 19 is shown here in phantom to indicate that some variation in the location of the pocket can be tolerated.

Figure 6:
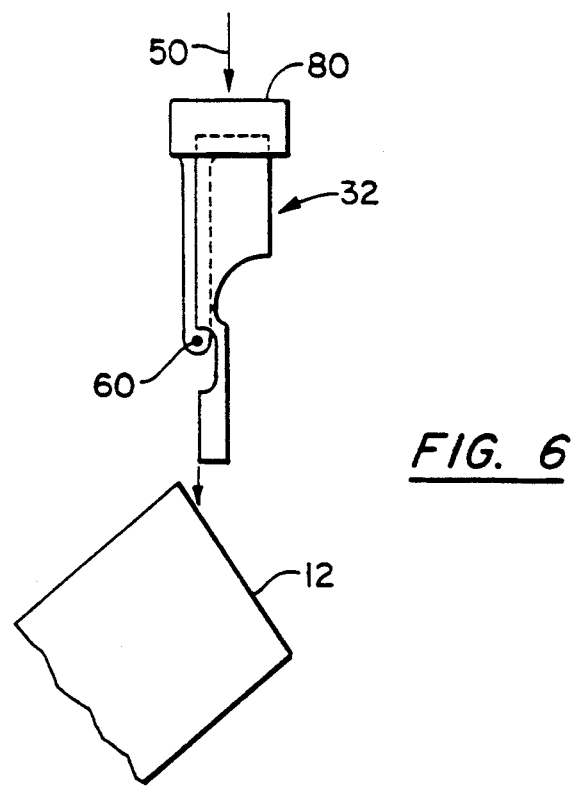
FIG. 6 is a front schematic view of the EDM apparatus.
Figure 7:
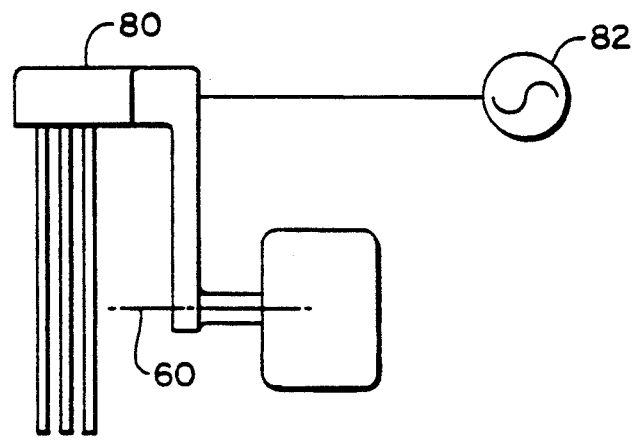
FIG. 7 is a side schematic view of the EDM apparatus.

The resulting opening is best seen by referring back to FIG. 2 where portion 76 provides a converging airflow pattern passing through slot 78 with guidance between ledges 66 and 68. In FIGS. 6 and 7 a schematic of the EDM apparatus is shown. The electrode 32 is held by support 80 at the desired angle with respect to surface 12 and parallel to the direction of motion 50. The electrode is energized from electric source 82 and moved axially 50 the desired distance It is then rotated around axis 60 to the point where the electrode is substantially perpendicular to the surface 12 forming the opening as described to FIG. 5. The electrode as formed is notched in two places so that the initial hole is not modified during electrode rotation. It, however, removes material as required to break into the air pocket 18 or 19. The ability to retain the material during rotation provides a hole which has increased guidance to airflow therethrough. Of course, it will be understood that under certain circumstances, with appropriately modified EDM apparatus, it may be desirable to maintain the electrode fixed and rotate the surface with respect thereto, to complete the formation of the air discharge hole.

I claim:

1. A method of producing low angle air directing slots in the tip of an airfoil in fluid communication with an internal pocket which is not axially aligned with the axis of said slots comprising:

forming an elongated electrode having a penetrating inboard end, an outboard end, and two substantially parallel edges comprising an outside edge and an inside edge;

forming a first notch in said outside edge;

forming a second notch in said inside edge at a location on the inboard side of first notch;

orienting said electrode at the desired low angle to the surface of the airfoil tip;

electrically energizing said electrode for electric discharge machining;

forming an air directing opening by axially advancing said electrode; and thereafter rotating said electrode to a position increasingly perpendicular to the surface of said tip with said first notch located at the tip surface, said second notch located at the surface of said air directing opening formed by the inside edge of said electrode, with the inboard end of said electrode penetrating into said pocket.

2. The method of claim 1 further comprising:
   rotating said electrode to a position substantially perpendicular to said tip surface.

3. The method of claim 1 further comprising:
   rotating said tip around an axis through a point located substantially at said second notch.

4. The method of claim 3 further comprising:
   said point being located at a mouth portion of said second notch of said electrode on an extension of said inside edge thereof.

* * * * *